United States Patent [19]
Etzion

[11] Patent Number: 6,020,037
[45] Date of Patent: Feb. 1, 2000

[54] ORNAMENTAL BUNTING

[76] Inventor: Rafael Etzion, 15 Henhawk Rd., Great Neck, N.Y. 11024

[21] Appl. No.: 09/048,371

[22] Filed: Mar. 26, 1998

[51] Int. Cl.[7] .................................................. B32B 3/10
[52] U.S. Cl. ......................... 428/12; 428/36.9; 428/181; 416/73
[58] Field of Search ........................... 428/36.9, 12, 181; 160/84.07, 134; 416/70 A, 73

[56] References Cited

U.S. PATENT DOCUMENTS 181,513  8/1876  Young ........................................ 416/73

FOREIGN PATENT DOCUMENTS 144239  1/1936  Germany .

*Primary Examiner*—Alexander Thomas
*Attorney, Agent, or Firm*—Robin, Blecker & Daley

[57] ABSTRACT

An ornamental bunting is formed of a length of fabric folded to form a plurality of pleats. Each of the pleats has an aperture therethrough, and a ring-shaped member passes through all of the apertures to maintain an end of the length of fabric in a gathered condition.

12 Claims, 3 Drawing Sheets

ORNAMENTAL BUNTING

FIELD OF THE INVENTION

This invention relates to decorative accessories, and more particularly, to an ornamental bunting formed from a length of fabric.

BACKGROUND OF THE INVENTION

Prior art ornamental buntings require complex and time consuming folding and stitching operations and are therefore expensive to manufacture.

OBJECTS AND SUMMARY OF THE INVENTION

It is an object of the invention to provide an ornamental bunting that can be manufactured conveniently and inexpensively.

It is a further object of the invention to provide an ornamental bunting that can be folded into a convenient form for storage.

It is still a further object of the invention to provide a convenient packaging arrangement for an ornamental bunting.

According to an aspect of the invention, there is provided an ornamental bunting, including a length of fabric folded to form a plurality of pleats, each of the pleats having an aperture therethrough, and a ring-shaped member which passes through all of the apertures to maintain an end of the length of fabric in a gathered condition.

According to another aspect of the invention, there is provided an ornamental bunting in a folded condition for storage, the bunting including a length of fabric folded to form a plurality of pleats, means for securing one end of the length of fabric in a gathered condition, and a tube formed of card or paper stock and having a rectangular cross-section, with the length of fabric extending through the tube in a gathered condition at the tube.

DESCRIPTION OF PREFERRED EMBODIMENTS

Figure 1:
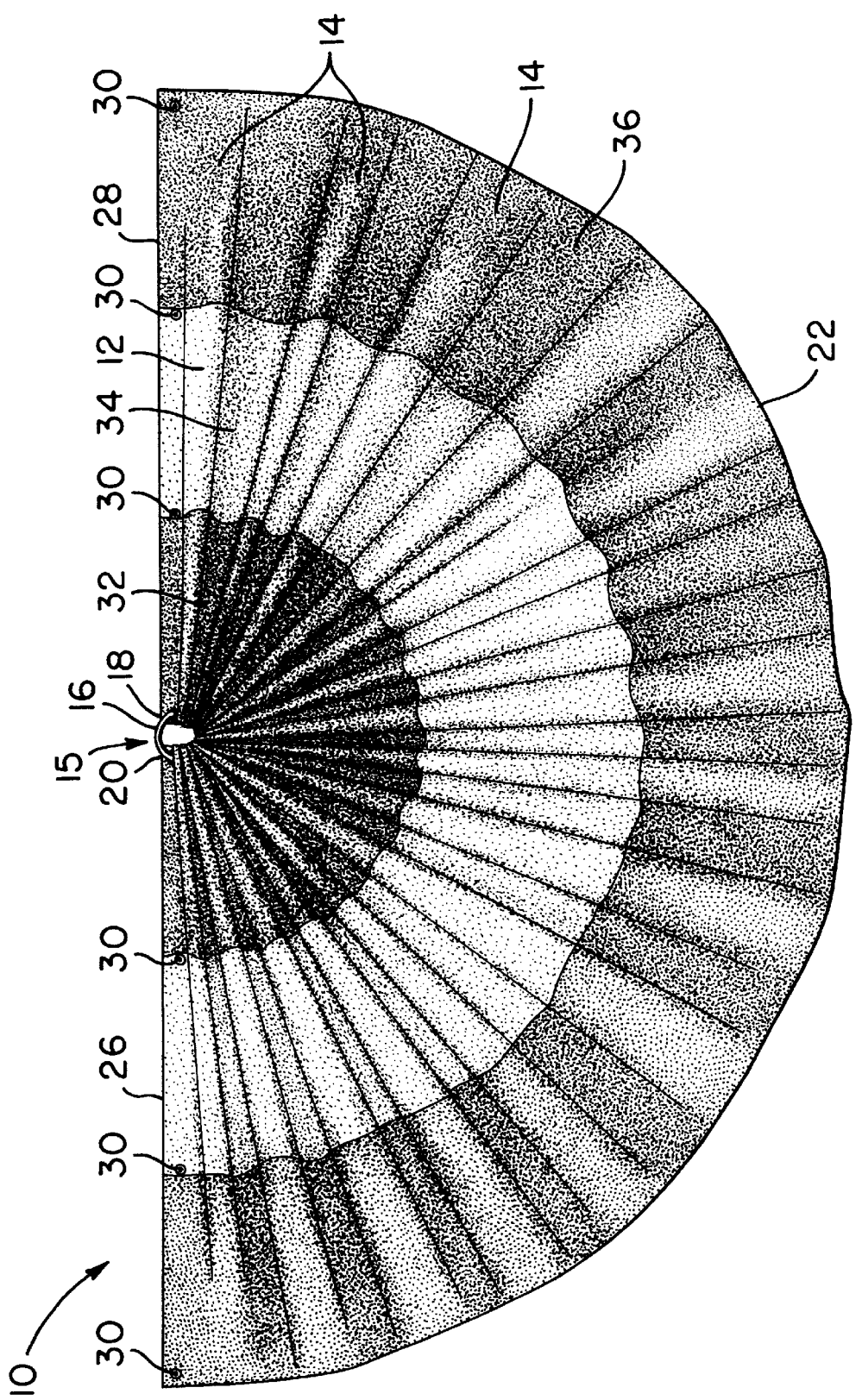
FIG. 1 is a front elevational view of an ornamental bunting provided in accordance with the present invention.

An ornamental bunting provided in accordance with the invention is shown in front view in FIG. 1 and is generally indicated by reference numeral 10.

As will be appreciated from FIG. 1 by those skilled in the art, the bunting 10 is formed from a rectangular length of fabric 12 folded to form a plurality of pleats 14. A long side of the length of fabric 12 is held in a gathered condition (indicated at 15) by a ring-shaped member 16, which holds corners 18 and 20 of the length of fabric in proximity to each other. The other long side 22 of the length of fabric is allowed to spread to form a substantially semi-circular perimeter so that the bunting 10 as a whole is generally in the shape of a fan.

It is to be understood that the pleats 14 are formed in the length of fabric 12 by a series of alternating left and right folds, so that the folding operation can be easily accomplished.

Figure 2:
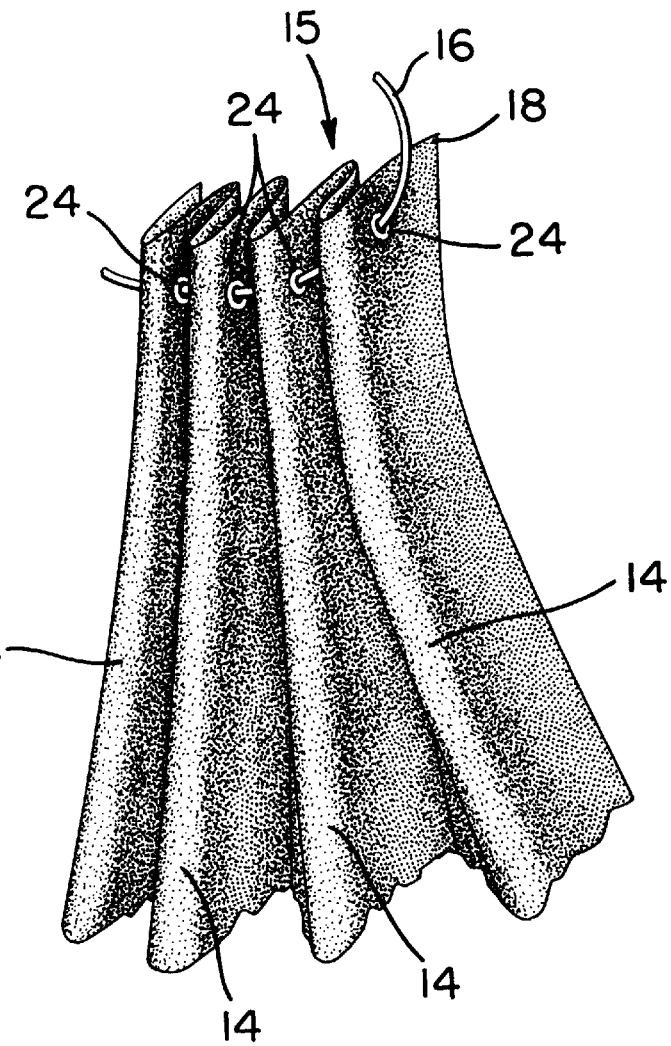
FIG. 2 is a partial perspective view of the bunting of FIG. 1, showing how a ring-shaped member of the bunting secures together one end of pleats in the bunting.

As best seen from FIG. 2, each of the pleats 14 is, in a preferred embodiment, pierced by apertures formed by eyelets or grommets 24 through which the ring-shaped member 16 is threaded to maintain the gathered condition 15 of the length of fabric at one side of the pleats.

Referring again to FIG. 1, edges 26 and 28 of the bunting 10 (being the short sides of the length of fabric 12), extend outwardly in respective opposite directions from the ring-shaped member 16 to form a diameter in relation to the semi-circular perimeter formed by the side 22 of the length of fabric 12. A series of grommets or eyelets 30 is installed along each of the edges 26 and 28. The grommets 30 are for receiving fasteners such as nails, tacks or wires, by means of which the bunting 10 may be mounted to a railing or to a surface such as a wall.

According to a preferred embodiment of the bunting 10, the length of fabric 12 includes three length-wise extending regions of contrasting colors, such as a red region 32, a white region 34 and a blue region 36. The length of fabric 12 is, according to a preferred embodiment, formed of brightly colored velvet on its front side, with a plastic backing. With the red, white and blue striping as described, the bunting 10 is especially suitable for use as a decoration on a patriotic occasion, such as the Fourth of July. The length of fabric 12 may be formed by sewing or otherwise joining together three strips of respectively-colored material.

It should be understood that the bunting need not be three-colored. Instead it may be monochrome, or may have two, four or more colored stripes. Color schemes other than red, white and blue are also contemplated, and two stripes of the same color, separated by a contrasting color, may be included. Striping may run radially rather than circumferentially, or fabric having a plaid or printed pattern may be employed.

Figure 4:
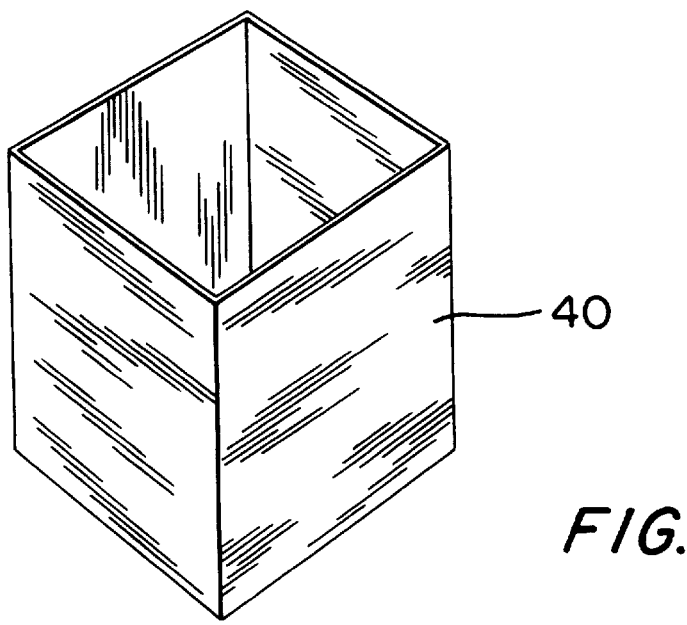
FIG. 4 is a perspective view of the cardboard tube shown in FIG. 3.
Figure 3:
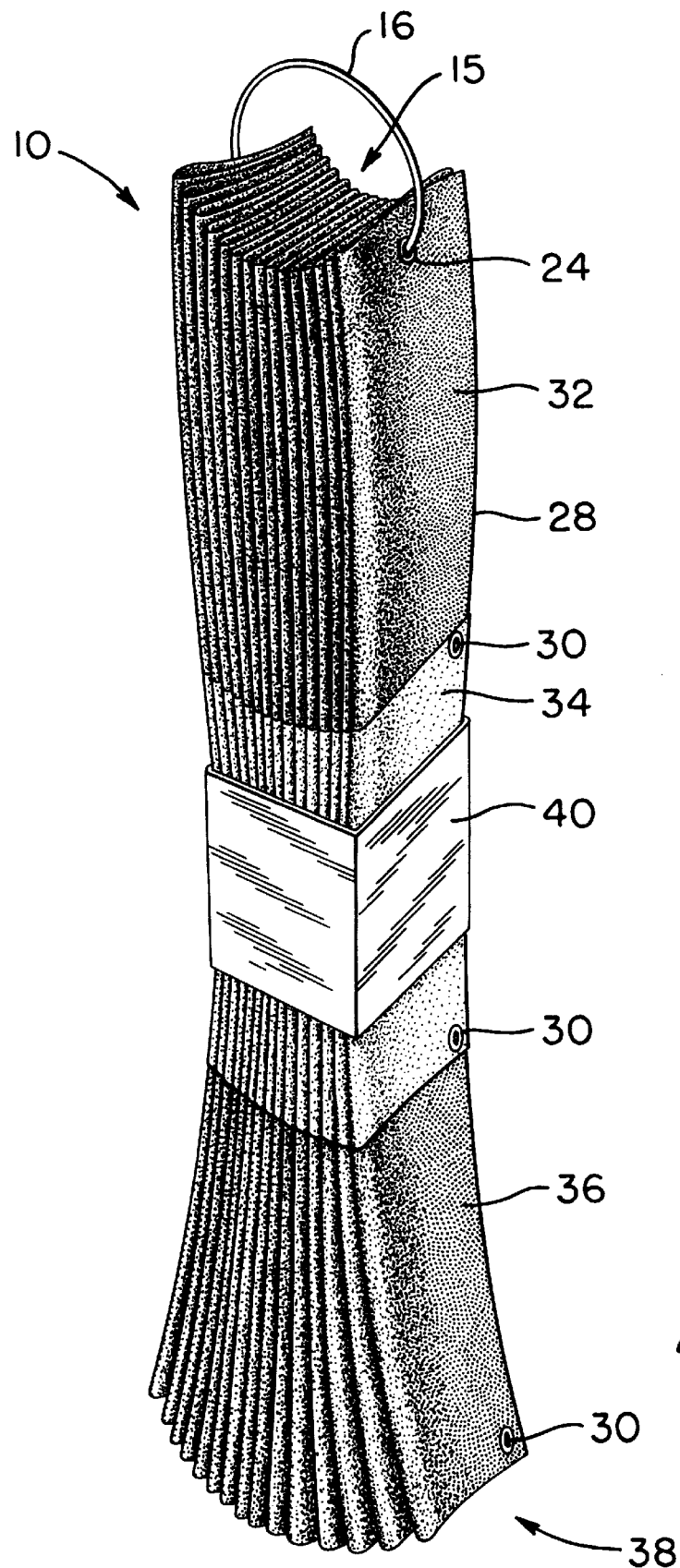
FIG. 3 is a perspective view of the bunting held by a cardboard tube in a folded condition suitable for storage.

It will be understood that the bunting is shown in FIG. 1 in a spread-open condition suitable for mounting as an ornament. FIG. 3 shows the bunting 10 in a closed or folded condition suitable for storage or shipment. It will be understood that the bunting can be transformed from its opened condition (FIG. 1) to its closed condition (FIG. 3) by gathering and folding together the free ends of the pleats 14 so that the bunting 10 exhibits a substantially square or rectangular cross section from its permanently-gathered end 15 down to the gathered free end indicated at 38 in FIG. 3. A tube 40, formed, e.g., of card or paper stock, is provided to maintain the bunting 10 in its closed position. The tube 40 has a square or rectangular cross-section which corresponds to the cross-section of the bunting 10 when the free end thereof is gathered. (The tube 40 is shown in perspective view without the bunting 10 in FIG. 4.)

Because the pleats 14 of the bunting 10 are formed of regular alternating right and left folds, it is quite easy to gather the free ends of the pleats to transform the bunting from its open position to its closed position. In the latter state, the bunting can easily be inserted through the tube 40 to allow the tube 40 to be positioned at a point along the bunting 10 remote from the ring-shaped member 16. Similarly, the transformation of the bunting 10 from its closed position to its open position is easily accomplished by sliding the tube 40 off the closed bunting and then opening the free end of the pleats.

The ring-shaped member 16 may be formed of any suitable material, including metal or plastic. The member may be closed by conventional means (not shown) such as a pin driven through holes in respective ends of a bent, nearly circular rod.

The size of a preferred embodiment of the bunting is such that each of the edges 26, 28 is substantially 18 inches long, corresponding to a length of 18 inches when the bunting is in the folded condition of FIG. 3. Of course, the bunting may be made larger or smaller than this preferred size.

The ornamental bunting provided in accordance with the invention is a particularly decorative item that can be manufactured efficiently and inexpensively and can be easily placed in a folded condition for storage or shipment.

Various changes to the foregoing article of manufacture may be introduced without departing from the invention. The particularly preferred article of manufacture is thus intended in an illustrative and not limiting sense. The true spirit and scope of the invention are set forth in the following claims.

What is claimed is:

1. An ornamental bunting, comprising:
   a length of fabric folded to form a plurality of pleats, each of said pleats having an aperture therethrough formed by an eyelet installed in the respective pleat; and
   a ring-shaped member which passes through all of said apertures to maintain an end of said length of fabric in a gathered condition.

2. An ornamental bunting according to claim 1, wherein each of said eyelets is made of metal.

3. An ornamental bunting according to claim 1, wherein said ring-shaped member is formed of metal.

4. An ornamental bunting according to claim 1, wherein said length of fabric has first and second edges extending outwardly from said ring-shaped member, and further comprising a respective series of grommets installed along each of the first and second edges, the series of grommets for receiving fasteners for mounting the bunting to a surface.

5. An ornamental bunting in a folded condition for storage, the bunting comprising:
   a length of fabric folded to form a plurality of pleats;
   means for securing one end of said length of fabric in a gathered condition; and
   a tube formed of card or paper stock and having a rectangular cross-section;
   said length of fabric extending through said tube in a gathered condition at said tube.

6. An ornamental bunting according to claim 5, wherein said means for securing comprises a metal ring passing through apertures in said pleats at said one end of said length of fabric.

7. An ornamental bunting formed of a pleated length of fabric having a gathered end and a free end, said free end spread to form a substantially semi-circular perimeter, and said fabric having edges substantially defining a diameter relative to said semi-circular perimeter, said bunting including a ring which passes through pleats in said fabric at said gathered end to keep said gathered end in a folded condition and further comprising a series of eyelets along said edges, said eyelets for receiving fasteners for mounting said bunting.

8. An ornamental bunting according to claim 7, wherein said diameter is at least about 36 inches.

9. An ornamental bunting according to claim 7, wherein said diameter is less than 36 inches.

10. An ornamental bunting according to claim 7, wherein said fabric has velvet at a front surface thereof and plastic at a rear surface thereof.

11. An ornamental bunting according to claim 7, wherein said fabric has a red, white and blue color scheme.

12. An ornamental bunting, comprising:
    a length of fabric folded to form a plurality of pleats, each of said pleats having an aperture therethrough;
    a ring-shaped member which passes through all of said apertures to maintain an end of said length of fabric in a gathered condition, said length of fabric having first and second edges extending outwardly from said ring-shaped member; and
    a respective series of grommets installed along each of the first and second edges, the series of grommets for receiving fasteners for mounting the bunting to a surface.

* * * * *